Patented Nov. 26, 1940

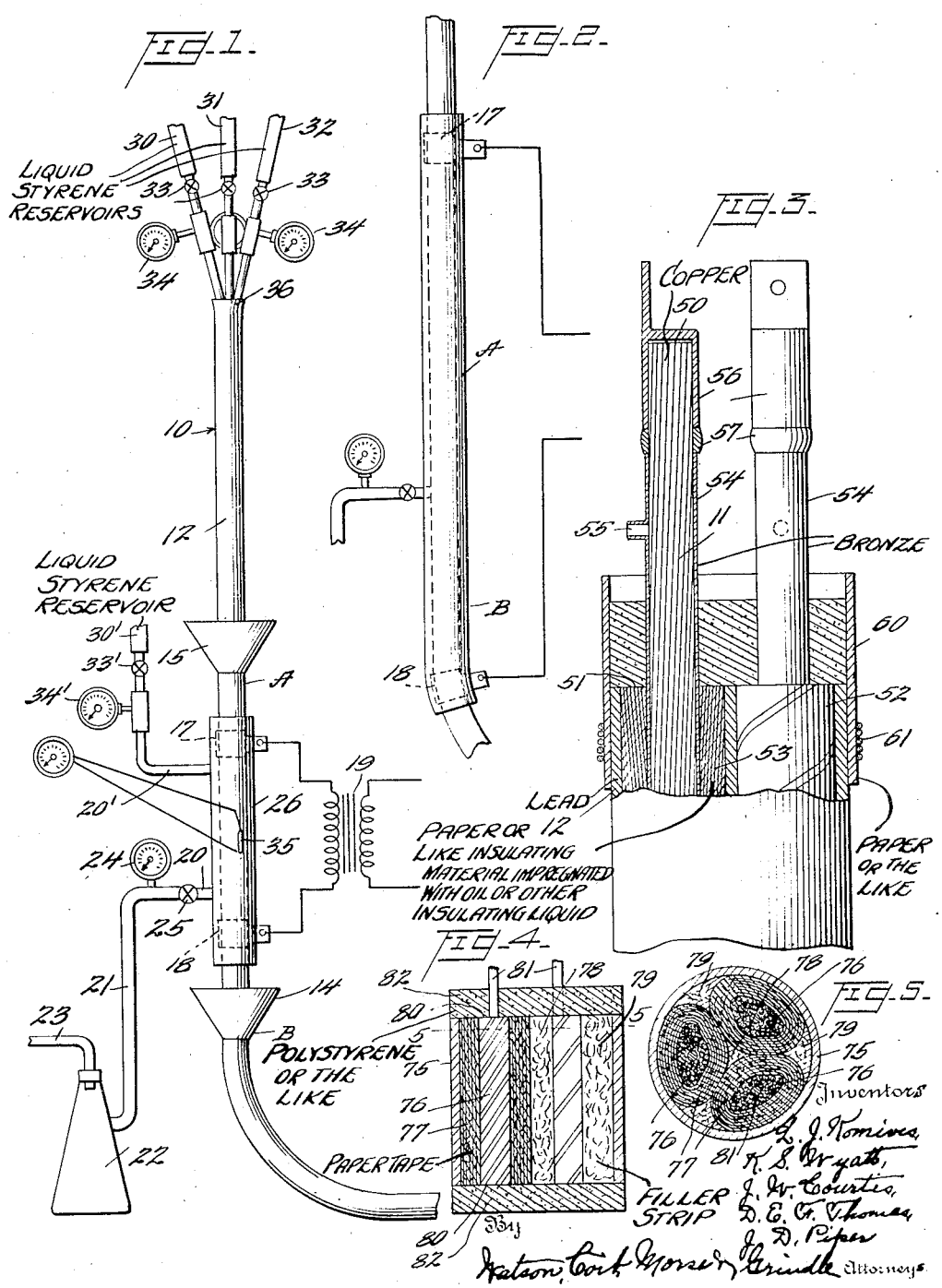

2,222,748

UNITED STATES PATENT OFFICE 2,222,748

FLUID STOP FOR POWER CABLES

Laszlo J. Komives, Kenneth S. Wyatt, Joseph W. Courtis, David E. F. Thomas, and John D. Piper, Detroit, Mich., assignors to The Detroit Edison Company, Detroit, Mich., a corporation of New York Application October 16, 1937, Serial No. 169,502

1 Claim. (Cl. 173—244)

This invention relates to electric power cables and more particularly to methods of and means for providing such cables with fluid stops or blocks to prevent the migration of insulating oil along the cable and/or the invasion of oil from external sources into said cable.

It is a general object of the present invention to provide novel and improved methods of and means for forming fluid blocks or stops in electric power cables.

More particularly it is an object of the invention to provide methods of and means for forming fluid stops in new or existing cables without removing the sheath therefrom.

An important feature of the invention consists in the method of washing or driving out existing insulating fluid from the solid layered insulation in the section of the cable where a fluid block is to be formed and in replacing said fluid with a thin insulating liquid which can be subsequently solidified into an excellent insulator which is bonded to the conductors, the insulating material and the sheath.

Another important feature of the invention resides in the provision of methods of and means for sealing off the immediate end of a cable while at the same time permitting the introduction of the liquid which subsequently forms the fluid block.

A further feature of the invention resides in the provision of means to limit the flow of the fluid block forming liquid within the cable during impregnation to confine it to desired portions thereof and to limit the amount of material used.

A still further feature of the invention comprises the introduction of the block forming liquid into the spaces between the strands of the cable conductors which are thus used as channels to carry the liquid longitudinally to the section chosen for the fluid stop and in then moving the liquid radially through the insulation to impregnate the same.

Another important feature of the invention resides in the provision of end caps for cables, moulded in position, bonded to all of the solid materials of the cable and having electrical constants similar to that of the original cable insulation.

Other and further features and objects of the invention will be more apparent to those skilled in the art upon a consideration of the accompanying drawing and following specification wherein is disclosed apparatus for carrying out an exemplary method in accordance with the present invention.

In said drawing:

Figure 1 is a schematic elevational view of a cable end with apparatus applied thereto for performing a method according to the present invention of providing a fluid stop or block adjacent the end thereof;

Figure 2 is a fragmentary view of an arrangement of apparatus at another step in the process;

Figure 3 is a view, on an enlarged scale, showing a longitudinal section through the end of the cable and a conductor thereof, as prepared for the performance of the method of Figure 1;

Figure 4 is a section through a test section of cable equipped with polymerized end caps; and Figure 5 is a section on line 5—5 of Figure 4.

In a power cable system it is essential to prevent the migration of the impregnating insulating fluids along the cable. Such fluids may be caused to migrate by differences in elevation of portions of the cable. Migration is particularly serious where vertical runs are necessary, as for instance in buidings. The elevated portions of the cable become starved for oil, voids are formed, corona discharges may start, resulting in the ultimate destruction of the insulating material and of the cable. It is also important to prevent the invasion of oil from external sources as for instance from transformer and oil switch tanks, compound filled joint boxes and the like, for these particular oils have different qualities, consistencies and insulating characteristics from the impregnating fluid or may be contaminated and may seriously effect the electrical characteristics of the cable.

In accordance with the present invention it is proposed to form a fluid stop or block in the cable of an insulating material which is normally liquid but which is subsequently solidified. To be satisfactory such a material after solidification must not be soluble in insulating fluids and must not be effected by temperatures commonly found in power cables. It must be chemically stable, must possess good insulating qualities, should have a low coefficient of expansion, should bond with the conductors, the insulating materials and the cable sheath to ensure fluid tightness and should have a sufficiently low cost to make it economically feasible to use.

Complying with the above qualifications are a number of liquid materials the class of which may be generally described as readily polymerizable aromatic hydrocarbons of the vinyl type for which the general monomeric formula may be set down as follows:

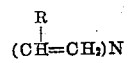

where R is any aromatic hydrocarbon radical which contains less than 4 benzene rings, and N is the number of vinyl groups attached to the aromatic radical.

These materials can be readily polymerized to change them from the liquid to the solid state and have the necessary characteristics in the polymerized form to satisfy all the requirements for a suitable cable block. Not only are they insoluble as polymers in insulating fluids but in the liquid form they are excellent solvents for the insulating fluids whereby such fluids can be washed out of porous insulation by the polymerizable liquid to provide substantially pure liquid to be polymerized within the cable.

While materials falling under the above broad definition are satisfactory for the carrying out of the methods of the present invention, for the sake of simplicity these methods will be described as performed with one material from the class variously known as styrene, styrol, or styrolene and in the terminology of the chemist as phenyl-ethylene, ethylene-benzene, vinylbenzene, or cinnamene. This liquid is an unsaturated aromatic hydrocarbon which can be polymerized completely at temperatures below 125° C. in a reasonable length of time, i. e., 24 to 72 hours to a polymer having a molecular weight of over 100,000 or to the so-called eucolloidal range where the product is a tough, rigid, permanent solid, insoluble in insulating fluids, having a sufficiently high melting point for the present purpose and having electrical characteristics at least as good as the usual insulating fluids. An important feature of styrene is its low viscosity permitting it to be introduced readily into the cable and passed through the more or less porous insulating materials forming the original solid insulation thereof.

In accordance with the present invention the fluid block is preferably formed adjacent one end of a new or installed cable but it will be appreciated that similar methods can be used to apply a fluid stop at a position remote from the ends of the cable.

Briefly, the invention comprises introducing the liquid styrene into the spaces between the stranded conductors of the cable, using them as tubes to carry the processing material longitudinally from the end of the cable to the section chosen for the fluid stopping block. At this section the processing material is passed radially through the insulation into the filler spaces between the conductors. The processing material displaces the insulating fluid component of the cable insulation and a mixture of this fluid dissolved in the processing material is drawn out of the cable through an opening in the sheath under the action of a suitable vacuum. Eventually all of the insulating fluid is washed out, the flow of liquid is stopped and polymerization is effected to solidify the styrene which now fills all of the voids within the sheath in the treated section.

Referring now to the drawing, there is shown in Figures 1, 2 and 3, a cable 10 of conventional form having stranded conductors 11 and a lead sheath 12. The conductors are insulated from each other and the sheath in any conventional manner, such as with coiled paper tapes suitably impregnated with oil or a similar insulating compound. It is desired to provide a fluid stopping block in a section of the cable adjacent or near the end thereof, for instance, in the section between the reference characters A and B.

In order to prevent the migration of the treating liquid to sections of the cable where it is not desired to have it, the sheath may be temporarily equipped with cups or reservoirs 14 and 15 adjacent the points A and B and capable of containing a supply of cooling material which will sufficiently solidify or immobilize the existing insulating oil in the adjacent portion of the cable to prevent it from migrating or being acted upon by the treating liquid. Where extremely low temperatures are necessary, dry ice or a mixture thereof with acetone may be resorted to. Hereafter these reservoirs or cups filled with cold material will be referred to as "cold blocks" for they can be any suitable cooling means capable of providing the requisite temperature.

Between these "cold blocks" it may be desirable to maintain the cable at an elevated temperature to facilitate the flow of insulating fluid and treating liquid and this can be effected either by heating the conductors themselves as by a suitable application of current thereto or by heating the sheath, or both. In the event that the sheath is to be heated clamps 17 and 18 may be applied thereto as shown in Figure 1 and connected to the secondary of transformer 19 energized from any suitable source of power controllable to regulate the temperature existing in the sheath between the clamps.

In order to apply a vacuum for drawing the treating material radially through the insulating material a nipple 20 is inserted through a suitable opening cut in the sheath at a point between the cold blocks and is attached by piping 21 to a receiver 22 which is connected by a pipe 23 to a vacuum pump. A gauge 24 will indicate the degree of vacuum obtained and the valve 25 permits a closing off of the nipple from any external sources.

It is highly desirable to encase at least the heated portion of the cable sheath in a suitable heat insulating material 26 to help maintain the temperature uniform and to reduce the expenditure of energy. This may be extended to include the cold blocks if desired, and is shown as fitted over the current conducting clamps 17 and 18.

In Figure 1 the reservoirs 30, 31 and 32 are constructed to hold the styrene or other treating liquid and are connected by tubes as shown to sleeves surrounding the exposed portions of the conductors, valves 33 being interposed and pressure gauges 34 being connected as shown.

The process is conducted as follows: the end 36 of the cable sheath is sealed or capped in any suitable manner, as will be later described, so that the processing material can be introduced into the stranded conductors and is prevented from flowing out of the end of the cable. This sealing cap must also prevent the flow of processing material in any other direction except along the stranded conductors and radially through the insulation. The two cold blocks are suitably packed with cooling material, heat is applied through the transformer 19 and/or through the stranded conductors, the vacuum is turned on at valve 25 while the valves 33 remain closed. When all of the pressure gauges indicate that the pressure is below atmospheric, valves 33 are opened so that styrene can flow from the reservoirs into the conductors. The processing material will then flow through the strands of the conductors and after a suitable length of time radially through the insulation between the cold blocks where the vacuum is confined. It will then flow out through the nipple 20 to the receiver 22.

At first the liquid entering 22 will be substantially all impregnating oil but it will soon become diluted with styrene and after a considerable time only pure styrene will flow out through the opening in the sheath indicating that it has supplanted the oil between the cold blocks. Suitable tests will indicate this condition. The valve 25 may now be closed and the heating continued at a temperature below 125°, as indicated by thermocouple 35, in order to polymerize the styrene. After a short period of heating the styrene begins to solidify or at least to become gelatinous and the cold blocks can be removed. At this time it is desirable to extend the length of the heated section so that the clamps 17 and 18 may be respectively raised and lowered to positions above and below points A and B, as shown in Figure 2, to ensure uniform temperature in the treated section of the cable. The heat insulating casing may also be extended as shown.

After substantially complete solidification of the processing material the heating is discontinued and the cable is allowed to cool slowly. During the solidifying and cooling periods it is desirable to have a static head of the processing material on the treated section of the cable to compensate for any contraction that may occur and this is done by maintaining the valves 33 open. Materials such as styrene and the others mentioned herein are capable of hardening by polymerization at the operating temperatures of cables but require longer periods of time than where the temperature is elevated to as much as 125° C. This being the fact any quantity of liquid entering near the end of the heating period or during the cooling period will subsequently polymerize and will not remain in a liquid state.

When the cable has returned to normal temperature the nipple 20 is removed, the lead sheath repaired and the cap on the end 36 of the sheath cut off and discarded. The cable is then ready for use with the fluid stop block in position.

While the method described above is entirely suitable for most known forms of cables, it has been found that results can be attained much more rapidly in the so-called belted cables by a slight modification in the process just described. The belt in a cable usually comprises several layers of insulating material such as paper tape wrapped around the several conductors and their insulation as a unit. This belt serves to hold the conductors and the filler strips in position and provides some additional insulation between the conductors and the sheath. It lies immediately within the lead sheath.

It has been found that with this type of cable too long a time is required for the styrene to penetrate the belt layer to wash out and replace the insulating fluid therein particularly at points remote from the exit nipple 20. So for this purpose it has been found advisable to provide a second nipple 20' at some point between A and B, and in the vertical job some distance above the nipple 20 as shown in Figure 1, to which is connected another reservoir 30' for styrene under the control of a valve 33'. This assembly is provided with a pressure gauge 34' so that it is substantially identical with the assembly used for providing styrene to the conductors of the cable.

In operation, it may be found desirable to carry out the process as previously described and to then open the valve 33' to wash out and replace the insulating fluid in the belt and between it and the sheath. Under certain conditions it will be found that this operation can be carried on simultaneously with the first portion of the process probably with some regulation of the valves 33 and 33' to ensure the proper distribution of the styrene throughout the whole mass of the insulation.

Obviously it is not essential that the cable be in a vertical position to be treated although this is preferable. Certainly if the cable is horizontal the process can be carried on with equal facility although it may be desirable to elevate the reservoirs 30, 31 and 32 and connect them by appropriate tubing to the ends of the conductors to ensure an adequate static head.

Previously reference has been made to a suitable cap or end seal to close up the end of the sheath and cable insulation to ensure that the treating liquid enter only the passages between the strands of the conductors. The conditions at the ends of a cable are such that a satisfactory gasket and sealing cap or cover can not well be applied. The surfaces are irregular from cutting or tearing of the insulation and it is required that a real tight seal be made. This can best be made by using a liquid or semi-liquid which may be solidified and a great many are satisfactory for the purpose. It is preferable that they be quickly and readily solidified and that in so doing that they properly bond to the paper in the cable to the lead sheath and to sleeves arranged around the conductors, and that they be insoluble in the monomer of the processing fluid or in the cable oil. The hardening which should not be accompanied by shrinkage may take place by chemical reaction, temperature change, removal of one component by evaporation, etc. In addition to the material specifically defined below such other materials as the monomers of readily polymerizable materials, such for instance, as esters of acrylic acid and its derivatives may be used.

One specific method for forming the end seal for a cable for use with the process described in connection with Figures 1 and 2 is illustrated in conjunction with Figure 3. In this case the end of the cable has been cut off perpendicularly at 50 and the lead sheath 12 has been cut back to the position shown at 51. Likewise the insulation 52 of the individual conductors and any fillers, belts or the like 53 cut back to the same point.

To ensure that the liquid enter only between the strands of the conductors each one is tightly encased in a sleeve or tube 54, preferably formed of phosphor bronze which is driven down over the end of the conductor and for a distance of at least several inches between the insulation 52 and the conductor, the end of the tube being appropriately tapered as shown for the purpose. Each of these tubes is provided with a nipple 55 for connection to the treating liquid reservoirs, to the valves and the pressure gauges. The tubes 54 are preferably capped by means of cable lugs 56, soldered as at 57 to the tops of the tubes. These lugs may be used for introducing current to the conductors if conductor heating is found desirable.

A cup is formed about the end of the cable by means of the tightly fitting tube 60 which may be of paper or cardboard wound into place and secured with wrappings of twine as at 61. The sole purpose of this is to form a fluid-tight cup and since it is not permanent its construction is unimportant. Oil is introduced into the nipples 55 and the inside of the cup is washed with liquid styrene to dissolve the oil component of the insulation from the exposed surfaces on the end of the cable insulation and walls of the sheath. A mixture of monomeric styrene and a suitable catalyst is poured into the cup, substantially filling it. Such a catalyst which may be the well-known stannic chloride causes rapid and complete polymerization of the styrene which becomes a solid, bonding to all surfaces with which it is in contact and ensuring a positive sealing of the end of the sheath, a fluid-tight joint with the sleeves 57 and the closing of the ends of the insulation. It has been found that polystyrene resulting from the use of stannic chloride is not entirely insoluble in cable oil and it is preferred to use maleic anhydride in the proportions of one part thereof to two parts of monomeric styrene. Heat is applied to start the exothermic reaction which rapidly hardens the material.

The oil first introduced into the conductors is to ensure against any of the quick setting styrene getting to the strands, hardening there and preventing the subsequent introduction of the liquid used for forming the fluid stop.

After the cap has hardened the process previously described, or suitable variations thereof, is then carried out and the cap removed to permit the ends of the cable to be connected by any desired means.

It has been found that oil stops constructed according to the method described above are entirely satisfactory, no leaks occurring past the stop even though pressure exceeding twenty pounds per square inch were maintained for a period of many hours.

Under favorable conditions the making of the oil stop or seal as defined above can be carried out in six to eight hours on 350,000 circular mil shielded cable. The polymerization period is arbitrarily fixed at 48 hours with the sheath maintained at a temperature of about 115° C. Automatic temperature regulation can be provided so that no supervision is necessary during polymerization.

By suitable control of the polymerization the stop portion of the cable can be maintained sufficiently flexible for most purposes, but if a decided bend is necessary the polymer can be softened by the application of heat, softening beginning at about 85° C. However, it is usually possible to shape the cable before the stop is formed or while the material is still soft from the polymerizing heat, it being remembered that the polymerizing temperature is somewhat above the softening point of the polymer.

The cable end cap of moulded styrene shown in connection with Figure 3 is found to be of great advantage for other purposes than the temporary sealing of the end of a cable for the purpose of applying a fluid stop thereto. For instance, it provides an extremely satisfactory means for terminating a cable where it is to enter a pot-head, switch housing, transformer casing, or the like, and in general for any cable termination where there is no splicing to a corresponding element.

In Figures 4 and 5 is shown an additional use for the end cap. In testing cables by means of high voltages for the breakdown of the insulation therein, there has been heretofore experienced great trouble at the ends of the samples due to so-called "creepage failure" in which the path of failure lies between the factory insulation and any other insulation used for capping or closing the end of the cable to prevent direct sparking between the sheath and the conductors or lead-in wires attached thereto. It is well established that ordinarily the boundary between two insulations is not capable of withstanding as high voltages as either of the insulations, specifically the factory installed cable insulation, particularly where there is a considerable difference in the dielectric properties of the two materials.

With end caps as described in connection with Figure 3, however, the excellent bonding of the polystyrene to the insulation of the cable eliminates the usual leakage path between the two materials and in addition the dielectric constants of polystyrene and the impregnated paper are so similar that no difficulties are experienced. The styrene provides an effective capping material which is cheap, easily applied and materially strengthens the end of the cable both mechanically and electrically.

In Figure 4 there is shown a test section of cable having the lead sheath 75 enclosing three conductors 76 of the stranded sector type, each insulated with a laminated layer 77 of paper tape or similar material. Filler strips 78 and 79 are shown closing the voids between the insulation of the three conductors and between the insulation of each pair of conductors and the sheath. All of the solid insulating material is impregnated in the customary manner with an insulating fluid.

In preparing a sample for test, the ends are cut off at right angles as at 80, lead-in wires 81 of relatively small diameter are attached to each of the conductors at one end and both ends of the section are capped with blocks of styrene 82, either by the method described in connection with Figure 3 or by the use of pure monomeric styrene polymerized by heat in the same manner as described in connection with the fluid stop in the cable of Figures 1 and 2.

With a sample arranged as shown, it has been found that 5.5 times the rated voltage of the cable can be applied to the conductors and in a specific instance this test showed that the styrene to insulation bond was withstanding approximately 240 volts per mil of distance between the electrodes. Without the styrene cap, a similar sample broke down at .6 rated voltage.

In addition to the elimination of "creepage failures," styrene caps are advantageous for several other reasons. In addition to the high dielectric strength, its surface leakage and power factor are low. Because it is applied in liquid form with low viscosity, it readily flows around and bonds to irregular shaped and rough objects, such, for instance, as stranded sector conductors as shown in Figure 5.

Properly applied, the styrene cap will withstand considerable internal pressures in the cable especially if reinforced at its junction with the end of the sheath, for instance, by a sheet of tin soldered to the sheath and extending up alongside of the end cap in the manner of the cup material 66 of Figure 3.

Having thus described the invention, what is claimed as new and desired to be secured by Letters Patent is:

The method of forming a fluid stop near the end of a finished sheathed cable having a stranded conductor insulated with laminated material impregnated with an insulating fluid, comprising applying a tube over the exposed end of the conductor, completely sealing the whole cable end to the tube walls, applying cold blocks to the cable sheath at stations defining the ends of the desired stop to immobilize the impregnating fluid thereat, continuously delivering a polymerizable, solvent liquid into the stranded conductor through said tube, applying a vacuum to an aperture in the sheath between said stations, removing the fluid and solvent through said aperture until substantially all fluid is replaced by said liquid, heating the sheath during such treatment, closing said aperture, maintaining a head on said liquid, continuing the heating to polymerize the liquid in situ, removing the cold blocks when thickening of the liquid is achieved, extending the heated area until polymerization is sufficient and cooling the cable slowly.

LASZLO J. KOMIVES.
KENNETH S. WYATT.
JOSEPH W. COURTIS.
DAVID E. F. THOMAS.
JOHN D. PIPER.